Nov. 24, 1942.  D. D. PEEBLES ET AL  2,303,063
COOLING APPARATUS
Filed Aug. 2, 1940
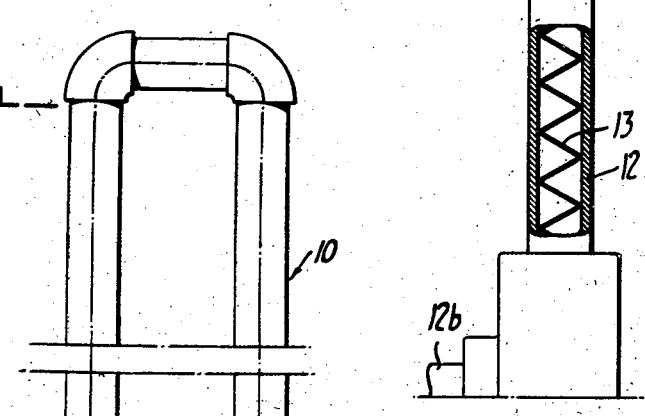
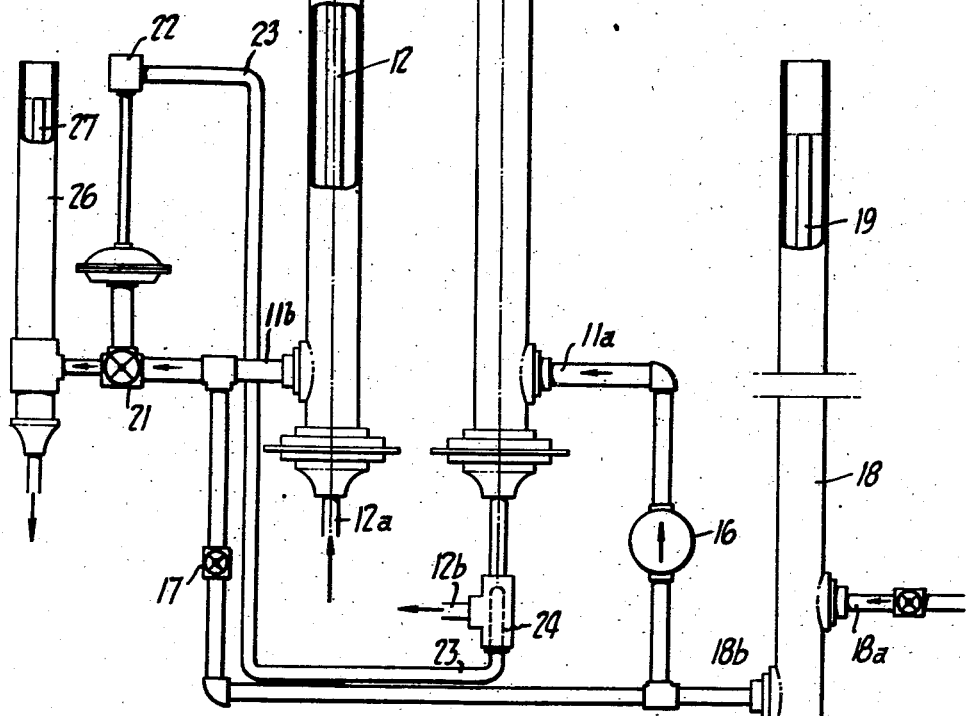
INVENTORS
David D. Peebles
John M. Meyer
BY Paul D. Flehr
ATTORNEY Patented Nov. 24, 1942

2,303,063

UNITED STATES PATENT OFFICE 2,303,063

COOLING APPARATUS

David D. Peebles, Berkeley, and John M. Meyer, San Francisco, Calif., assignors to Golden State Company, Ltd., San Francisco, Calif., a corporation of Delaware Application August 2, 1940, Serial No. 349,416

2 Claims. (Cl. 257—2)

This invention relates generally to apparatus for effecting controlled cooling of various liquid materials. The invention is particularly applicable to cooling operations involved in the processing of various food materials.

In the processing of various liquid food materials, such as tomato pulp, it is frequently desirable to rapidly chill the material to a predetermined temperature level. For example, in the processing of tomato pulp preparatory to introducing the material into cans, the pulp is subjected to evaporation to concentrate the same, and it is delivered from the last evaporating stage at a temperature in excess of 212° F. Where ordinary canning methods are employed, it is desirable to cool the concentrate to a temperature below 212° F. before it is introduced into the cans. Rapid cooling is desirable in order to minimize the time period during which the material is subjected to temperatures in excess of 212° F. Also it is desirable to chill the liquid material to a definite temperature level which is still sufficient to effect sterilization, as for example 190° F., irrespective of changes in the quality or temperature of the material being discharged from the evaporator.

It is an object of the present invention to provide cooling apparatus particularly adapted for services such as outlined above. Our apparatus is capable of rapid chilling of materials such as tomato paste from temperatures in excess of 212° F., as for example from 214° to 230° F., to a definite temperature level of say 190° F. The invention is characterized by a novel method for handling the chilling medium and for effecting automatic control of the chilling medium in accordance with temperature variations of the cooled material leaving the apparatus.

Additional objects and features of the invention will apepar from the following description in which the preferred embodiment of the invention has been set forth in detail.

Referring to the drawing:

Figure 1 is a diagrammatic side elevational view, partly in cross section, showing the present invention; and Figure 2 is an enlarged cross sectional detail showing a part of the heat transfer tube 12.

Our apparatus makes use of a heat exchange unit formed to provide an attenuated path for flow of the liquid material to be cooled, and another separate flow path for a cooling liquid like water. The heat exchange unit 10 shown in the drawing consists of pipes 11 connected at their upper ends, and within which there is a tube or pipe 12 for conveying the liquid material to be cooled. The inlet end 12a of tube 12 receives the stream of liquid material to be cooled. Where tomato paste is being cooled, the paste flows directly from the last stage of evaporating equipment, either by gravity or by use of a suitable pump.

The lower ends of pipe 11 have inlet and outlet connections 11a and 11b for introduction and removal of water or like cooling liquid. Within tube 12 either for its entire length or for a length near the outlet 12b, there is a zigzag metal strip 13, for a purpose to be presently explained. The inlet 11a connects to the discharge side of a liquid circulating pump 16, and the inlet side of this pump connects with the outlet 11b through the throttling valve 17. Pump 16 therefore continuously recirculates cooling water through the pipes 11. The inlet side of pump 16 is also connected to a source of additional cooling liquid at substantially constant pressure. Thus a stand pipe 18 is shown, with its inlet 18a connected to a source of cool water, and with its outlet 18b connected to the inlet side of pump 16. The overflow pipe 19 extending through pipe 18 determines the height of the liquid column maintained in pipe 18, and therefore serves to maintain a constant head or pressure at the outlet 18b.

To effect a controlled bleeding off of recirculated cooling liquid, a diaphragm control valve 21 has its inflow side connected to the outlet 11b. The pressure chamber of this valve is shown connected to a controller 22, which in turn is connected by the control line 23 to the temperature responsive bulb 24. Bulb 24 is located in the outlet end of tube 12, so that it is intimately contacted with material being withdrawn at 12b. The controller 22 may be any one of a number of suitable devices for this purpose. For example, it may be adapted to apply varying pneumatic pressures to the operating chamber of valve 21, responsive to variations in the temperature of the bulb 24. Thus with an increase in temperature of bulb 24, valve 21 is operated to open the same and thus increase the bleed-off of cooling water. Conversely, when the temperature of the bulb 24 decreases, valve 21 is moved towards closed position to decrease the drawoff of water.

For reasons to be presently explained, it is desirable to place a small back pressure head upon the discharge side of valve 21. For this purpose I have shown a stand pipe 26 having its lower end connected to valve 21. Overflow pipe 27 extending within pipe 26 determines the height of the liquid column which is maintained as a back pressure head.

Operation of the apparatus described above is as follows: It will be presumed that the inlet 12a is connected to receive hot tomato paste at temperatures above 212° F., and that this paste is being cooled to a definite temperature of say 190° F. as it leaves the outlet 12b. Pump 16 operates to continuously recirculate cooling water through the pipes 11. Valve 21 is controlled in accordance with the temperature of the cooled tomato paste leaving outlet 12b. Normally a certain amount of bleed-off occurs continuously, and a slight increase in temperature of the tomato paste increases the bleed-off, and conversely a reduction in temperature decreases the bleed-off. Throttling valve 17 causes a building up of pressure upon the discharge side of pump 16, which pressure is ample to discharge liquid through valve 21, against the back pressure caused by pipe 26. Depending directly upon the bleed-off of water through valve 21, additional amounts of cooling water are supplied to the inlet of pump 16 from the stand pipe 18.

The flow rate of water into the stand pipe 18, from inlet 18a, is at all times greater than the flow rate through outlet 18b to the pump 16. In other words, there is always an excess of water discharging through the overflow pipe 19. Thus a constant head or pressure is maintained at the outlet 18b, which makes for smoother and more accurate control. The rate of continuous recirculation through pump 16 is normally many times the rate of introduction of additional water from the stand pipe 18. For example, in typical instances the rate of recirculation through pump 16 may be from 50 to 100 times the rate of introduction of cool water from the stand pipe. Such recirculation of cooling liquid makes for rapid cooling, and at the same time it prevents the apparatus from being too critical or erratic in operation.

Use of a definite back pressure upon the valve 21 facilitates adjustment of the apparatus to a variety of conditions. For example, by making changes in the back pressure head it is possible to change the flow rates through valve 21 without making changes in the size of the valve orifice.

The temperature of the water being recirculated by pump 16 will range somewhat less than the temperature of the cooled material being withdrawn from outlet 12b. For example, where this outlet temperature is 190° F., the temperature of the liquid on the discharge side of pump 16 may vary from 120 to 150° F. For the same example, the make-up water supplied to stand pipe 18 will be somewhat lower in temperature, as for example a temperature of from 55 to 70° F.

The zigzag strip 13 (Fig. 2) tends to prevent irregular controller action in that in flowing about the edges of this strip the stream of material being cooled is thoroughly intermixed before contacting the bulb 24. Extension of strip 13 for the entire length of tube 12 serves to improve the heat transfer.

We claim:

1. In apparatus for controlled cooling of liquid food materials, a heat exchange unit having one flow path for cooling liquid and another flow path for the liquid food material to be cooled, a recirculating pump having its discharge connected to deliver cooling liquid to the heat exchange unit and having its inlet connected to receive cooling liquid discharged from said unit, means for supplying additional cooling liquid to the inlet side of the pump, temperature controlled valve means for venting off a portion of the cooling liquid discharged from said unit, means providing a constant pressure head opposing the bleeding off of a cooling liquid, and flow restricting means interposed between said unit and the inlet side of the pump, said last means serving to maintain pressure on the discharge side of the pump to enable venting of liquid through the temperature controlled valve means.

2. In apparatus for controlled cooling of liquid food materials, a heat exchange unit having one flow path for cooling liquid and another flow path for the liquid material to be cooled, a recirculating pump having its discharge connected to deliver cooling liquid to the heat exchange unit and having its inlet connected to receive cooling liquid discharged from said unit, means providing a source of cooling liquid at constant pressure connected to the inlet side of the pump, means for effecting controlled bleeding off of a portion of the cooling liquid discharged from said unit responsive to the temperature of the cooled material leaving the heat exchange unit, means providing a constant pressure head opposing the bleeding off of cooling liquid, and a throttling valve interposed between the point of bleed-off of cooling liquid from said unit and the inlet side of the pump, said throttling valve forming a flow restricting orifice serving to maintain pressure on the discharge side of the pump to cause flow of cooling liquid through said bleed-off means.

DAVID D. PEEBLES.
JOHN M. MEYER.